United States Patent
Traversone et al.

(10) Patent No.: US 9,755,857 B2
(45) Date of Patent: Sep. 5, 2017

(54) AVIONIC ETHERNET NETWORK AND METHOD OF TRANSMITTING BLOCKS OF DATA IN THE NETWORK

(71) Applicant: SELEX GALILEO S.P.A., Campi Bisenzio, Florence (IT)

(72) Inventors: Massimo Traversone, Rome (IT); Mauro Luoni, Rome (IT)

(73) Assignee: SELEX ES S.p.A., Rome (IT)

( * ) Notice: Subject to any disclaimer, the term of this patent is extended or adjusted under 35 U.S.C. 154(b) by 0 days.

(21) Appl. No.: 14/649,162

(22) PCT Filed: Dec. 3, 2012

(86) PCT No.: PCT/IT2012/000365
§ 371 (c)(1),
(2) Date: Jun. 2, 2015

(87) PCT Pub. No.: WO2014/087434
PCT Pub. Date: Jun. 12, 2014

(65) Prior Publication Data
US 2015/0319010 A1 Nov. 5, 2015

(51) Int. Cl.
*H04L 12/52* (2006.01)
*H04L 12/40* (2006.01)
(Continued)

(52) U.S. Cl.
CPC ........ *H04L 12/52* (2013.01); *H04L 12/40189* (2013.01); *H04L 12/4625* (2013.01);
(Continued)

(58) Field of Classification Search
CPC ... H04L 12/52; H04L 12/4625; H04L 12/462; H04L 12/40091; H04L 12/40097;
(Continued)

(56) References Cited

U.S. PATENT DOCUMENTS 9,494,933 B1 * 11/2016 Jackson .............. H04L 41/0853
2006/0062143 A1 * 3/2006 Bibby .................. G05D 1/0077
370/225

(Continued)

FOREIGN PATENT DOCUMENTS

EP 1 841 138 A2 10/2007
EP 1 921 783 A1 5/2008
WO WO 2011/159209 A1 12/2011

OTHER PUBLICATIONS

Avionics Full-Duplex Switch Ethernet—Wikipedia.*
(Continued)

*Primary Examiner* — Warner Wong
(74) *Attorney, Agent, or Firm* — Merchant & Gould P.C.

(57) ABSTRACT

An avionics switched full-duplex Ethernet communication Arinc 664p7 network (100) includes at least two independent elementary networks (N1, N2). Each elementary network includes one or more end systems (ESI) suitable to act as source end systems for data frames transmitted over the network, and one or more end systems (ES4) suitable to act as destination end systems for such data frames. Each elementary network further includes a switching function block (SW1, SW2) connected between the source (ESI) and destination (ES4) end systems. The Ethernet network is has one of the source (ESI), destination (ES4) end systems and the switching function block (SW1, SW2) includes timers (204) suitable to generate a common piece of timing information to be sent to the other devices of the elementary network in-order to enable the transmission of the data frames over the elementary network by one of the source end systems (ESI).

9 Claims, 2 Drawing Sheets

(51) Int. Cl.
*H04L 12/46* (2006.01)
*H04L 12/931* (2013.01)
*H04J 3/06* (2006.01)

(52) U.S. Cl.
CPC .......... *H04L 49/351* (2013.01); *H04J 3/0658* (2013.01); *H04L 2012/4028* (2013.01)

(58) Field of Classification Search
CPC ......... H04L 12/4641; H04L 2012/4028; H04L 2012/5674; H04L 49/354; H04L 27/2655
See application file for complete search history.

(56) References Cited

U.S. PATENT DOCUMENTS

| | | | | |
|---|---|---|---|---|
| 2006/0215568 | A1* | 9/2006 | Smith | H04L 43/12 370/241 |
| 2007/0064851 | A1* | 3/2007 | Hall, II | H04L 12/1813 375/356 |
| 2008/0043768 | A1* | 2/2008 | Lopez | H04L 12/5693 370/412 |
| 2008/0112439 | A1* | 5/2008 | Vestal | H04J 3/0661 370/516 |
| 2009/0073984 | A1* | 3/2009 | Jackson | H04L 41/0803 370/394 |
| 2012/0250572 | A1* | 10/2012 | Hall | H04L 12/4625 370/254 |
| 2013/0034068 | A1* | 2/2013 | Taoka | H04W 72/0453 370/329 |
| 2013/0064216 | A1* | 3/2013 | Gao | H04L 5/0016 370/330 |
| 2013/0156427 | A1* | 6/2013 | Lopez | H04J 14/00 398/48 |
| 2014/0148197 | A1* | 5/2014 | Shields | H04W 4/22 455/456.1 |
| 2016/0285738 | A1* | 9/2016 | Portes | H04L 45/02 |

OTHER PUBLICATIONS

AFDX detail overview presentation, Condor Engineering, May 2008.*
International Search Report for corresponding International Patent Application No. PCT/IT2012/000365 mailed Aug. 19, 2013.

* cited by examiner

AVIONIC ETHERNET NETWORK AND METHOD OF TRANSMITTING BLOCKS OF DATA IN THE NETWORK

TECHNICAL BACKGROUND OF THE INVENTION

This application is a National Stage Application of PCT/IT2012/000365, filed 3Dec. 2012, and which application is incorporated herein by reference. To the extent appropriate, a claim of priority is made to the above disclosed application.

FIELD OF THE INVENTION

The present invention relates to the transmission of blocks of data in an avionics switched Ethernet network in accordance with standard Arinc (Aeronautical Radio, Inc) 664p7. Particularly, the invention relates to a redundant Ethernet network of the Arinc 664p7 type and to a method for transmitting blocks of data on such a network.

DESCRIPTION OF THE PRIOR ART

The Ethernet networks are among the most widespread local area networks. Such Ethernet networks, as it is known, can operate in a switched mode, i.e., the end systems composing the network switch blocks of data (data frames) with each other through virtual links, so as to ensure the absence of collisions between such blocks. In more detail, a switched Ethernet network comprises a plurality of end systems, each of which is suitable to act as a source or destination end system for the blocks of data exchanged over the network. Such end systems are individually linked to a block of data switching device or switch, and multiple network switches are mutually connected by physical links.

As it is known to those skilled in the art, a virtual link between a source end system and a destination end system is defined as an oriented path through the network, which is used for transmitting blocks of data from the source end system only to the preset destination end systems. Similarly, such a virtual link can be defined based on an ordered list of switches that are present in the network, through which the blocks of data pass. At each switch passed through in the network, the data blocks are switched to the destination address using such ordered list of switches.

A switched Ethernet network is of the full-duplex type in the case where sending and receiving data blocks can occur simultaneously on the same physical link.

The avionics systems generally include a number of devices, each of which can exchange data with one or more other devices of the system. For example, a variety of external sensors can acquire information to be conveyed towards different components of the aircraft, through a communication network.

A network of the Arinc 664p7 type, which was developed for avionics applications, is an example of a switched Ethernet network in which a virtual link can be allocated a bandwidth. Particularly, such Arinc 664p7 network is configured to associate to each virtual link both a minimum transmission time range of the data blocks, and a maximum format of such blocks. In accordance with such constraints, a maximum path time of each data block is ensured for each virtual link. Furthermore, the flow formed by a virtual link is not perturbed, by other flows that share the same physical links in the network. In addition, the virtual link ensures that the sum of the bandwidths allocated for the virtual links for a same physical link does not exceed the maximum capacity ensured by the technology.

In order to ensure suitable safety levels when transmitting data blocks, the Arinc 664p7 type network implemented on board of an aircraft is preferably a redundant network. In such a case, two network end systems, a source end system and a destination end system, communicate with each other through at least two independent elementary networks. The redundancy is implemented for each data block on each of such elementary networks. Particularly, the source end system sends two information data blocks to the destination end system on the corresponding virtual link. Each of such blocks is sent, with an identical content, on each of the two elementary networks. If the two networks works properly, both of the two identical blocks reach the destination end system, though at different times, based on the configuration of the two networks.

The above described avionics Arinc 664p7 networks of a known type are not free from defects.

Particularly, each end system sends its data blocks on the Arinc 664p7 network on the basis of a piece of timing information generated by the end system itself. Since the timing information associated to different network end systems are generally different from each other, the known Arinc 664p7 network does not allow suitably controlling the data blocks transiting the network.

Document EP 1921783 A1 describes a method and system for reducing transmission delay variation (or jitter) of real-time packets in a real-time switched network.

SUMMARY OF THE INVENTION

The object of the present invention is to devise and provide an avionics Ethernet network, in particular a redundant network in accordance with standard Arinc 664p7, which allows at least partially obviating the drawbacks set forth herein above with reference to the solutions of avionics networks of a known type.

Such an object is achieved by an Ethernet communication network of the Arinc 664p7type.

It is the object of the invention also a method for transmitting blocks of data in such an Ethernet communication network.

BRIEF DESCRIPTION OF THE DRAWINGS

Further characteristics and advantages of the redundant Ethernet network according to the invention will be apparent from the description set forth below of preferred implementation examples, given by way of indicative, non-limiting example, with reference to the annexed figures, in which.

DETAILED DESCRIPTION

Figure 1:
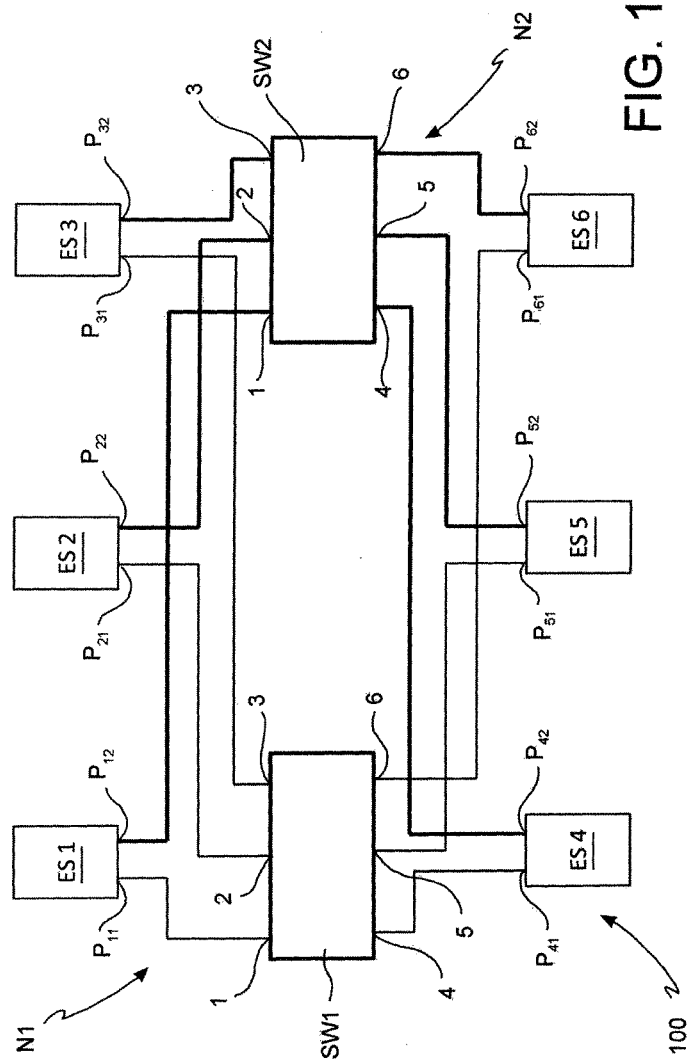
FIG. 1 illustrates an exemplary block diagram of a redundant Ethernet communication Arinc 664p7 network in accordance with the invention.

With reference to the above-mentioned FIG. 1, an avionics switched full-duplex Ethernet type communication network in accordance with standard Arinc 664p7 or Arinc 664p7 network or, more simply, network, is generally indicated by the reference numeral 100. Particularly, such Arinc 664p7 network 100 developed for avionics applications is a redundant network, i.e., it comprises at least one first N1 and one second N2 elementary networks that are independent of each other. Each of such first N1 and second N2 elementary networks comprises at least one first end system, for example ES1, suitable to act as a source end system for blocks of data (data frames) exchanged over the network 100, and at least one second end system, for example ES4, suitable to act as a destination end system for such data frames. Referring to the example of FIG. 1, both the first N1 and the second N2 elementary networks comprise in general six end systems ES1-ES6, each of which is suitable to act indifferently as a source or destination end system for the data frames exchanged over the network 100. It shall be noted that the overall number of end systems comprised in the above-mentioned elementary networks N1, N2 may exceed six. Such end systems ES1-ES6 can be any system employed in an avionics network, such as, for example, a sensor, an electrical switch, an avionics navigation tool, etc.

Furthermore, the first N1 and the second N2 elementary networks comprise a first SW1 and a second SW2 switching devices, or switches, respectively, each of which is connected between the first ES1 and the second ES4 end systems by a physical link. Particularly, both the first SW1 and the second SW2 switches are linked to all the end systems ES1-ES6 of the network 100 by physical links. In more detail, the first SW1 and the second SW2 switches comprise six first ports 1-6, each of which is connected to a corresponding second port $P_{ij}$ (where i=1 . . . 6; j=1 . . . 6) of one of the end systems ES1-ES6. Each of the above-mentioned first 1-6 and second $P_{ij}$ ports is configured to act as an input/output port for the data frames exchanged over the network 100.

In the Arinc 664p7 network 100, data are transmitted in the form of IP (Internet Protocol) packets embedded in the Ethernet blocks of data (or data frames), in particular by means of virtual links VL, i.e., paths oriented through the network 100 between one of the above-mentioned end systems ES1-ES6 acting as a source end system and the respective destination end systems.

A virtual link tag included in the header of each data frame is used for switching the frames on the Arinc 664p7 network 100 of the invention. When one of the switches SW1, SW2 receives a frame at one of the respective first ports 1-6 acting as an input, such a switch reads the virtual link tag and determines the port or ports among the other remaining first ports towards which the data frame has to be routed. That is, such a port among the remaining ones acts as an output. Advantageously, in the Ethernet network 100 of the invention, each of the elementary networks, for example the first elementary network N1, is such that one of the end systems ES1-ES6 or the respective data switching device SW1 comprises timing means that are suitable to generate a common piece of timing information to be sent to the other devices of the first elementary network N1 in order to enable the transmission of the data frames on said elementary network by any of the devices ES1-ES6.

By sake of simplicity, an implementation example of the invention will be described below, in which such timing means are associated to the switches SW1, SW2. Similar observations apply in the case where such timing means are associated to any of the end systems ES1-ES6.

Figure 2:
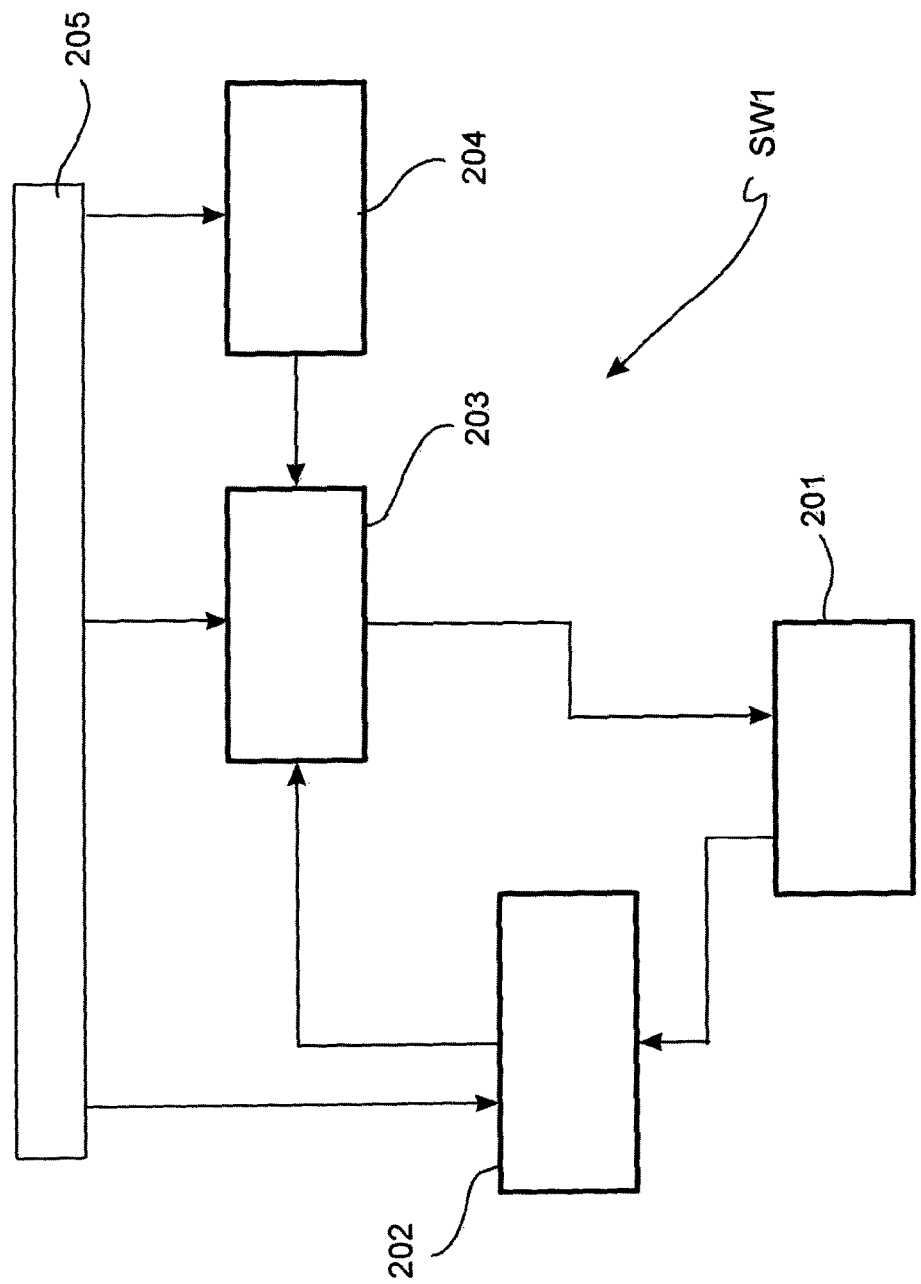
FIG. 2 illustrates an exemplary function block diagram of a switching device included in the Ethernet Arinc 664p7 network of FIG. 1 according to a preferred embodiment of the invention.

Referring to FIG. 2, a preferred implementation example of one of the switches SW1, SW2 comprised in the above-mentioned Arinc 664p7 network 100, for example, the first switch SW1, is described by a function block diagram. It shall be noted that, following the redundancy of the network 100, the first SW1 and the second SW2 switches are substantially the same.

In an embodiment, the above-mentioned first switch SW1 is produced by a digital integrated circuit of the Field-Programmable Gate Array type, or FPGA, in which each function implemented by the integrated circuit itself is programmable by a software. Such first switch SW1 comprises an input/output unit 201 for the data frame exchanged over the network 100. Such input/output unit 201 is, for example, implemented by a physical connector of the FPGA integrated circuit.

In addition, the first switch SW1 comprises a filtering function block 202 operatively connected to said input/output unit 201 and configured to perform a filtering or selection on the frames arriving at the switch SW1, in particular at the input/output unit 201, so as to determine, on the basis of first assessment parameters, if the incoming packets are, for example, in accordance with standard Arinc 664p7. Such first assessment parameters relate, for example, to: the frame length, i.e., the number of fields composing it (for example, Preamble, Start Frame Delimiter or SFD, Destination MAC Address, Source MAC address, Payload, etc.); the format of such fields; if the input port, among the first ports 1-6, that receives the frame is enabled to receive the frame identified by the Virtual Link VL associated thereto.

Furthermore, the first switch SW1 comprises a switching function block 203 operatively connected to both such input/output unit 201 and such filtering function block 202. The switching function block 203 is configured to manage the routing of the frames received by the filtering function block 202 towards the input/output unit 201. Particularly, such switching function block 203 is suitable to confirm the Virtual Link VL contained in each of the frames received to route such frames towards the correct output port of the first switch SW1, among the first six ports 1-6 shown in FIG. 1.

In a particularly advantageous embodiment, the timing means of the first switch SW1 are implemented by a time scheduling function block or unit 204 operatively connected to the data switching function block 203 to provide the common piece of timing information to such switching function block 203. In other terms, the time scheduling function block 204 is configured to dictate to the switching function block 203 the switching times of each Virtual Link VL of the first elementary network N1.

Particularly, such a time scheduling function block 204 of the first switch SW1 is suitable to transmit a common piece of timing information to all the end systems ES1-ES6 of the network 100 on the basis of first information extracted sequentially from a respective Virtual Link VL enabling table compiled in the initialization or start-up step of the switch SW1. Such first information are indicative of the enablement status of a preset Virtual Link VL of the network 100 through which the data frames can be transmitted. In other terms, by a piece of timing information common to all the end systems ES1-ES6, the time scheduling function block 204 is configured to enable sending of data frames by each of the end systems ES1-ES6 on the network Virtual Links VL enabled sequentially. In such a manner, it is avoided that each end system sends the frames over the network 100 based on a piece of timing information locally associated thereto, which generally differs from that of any other end system present in the same network 100.

An example of Virtual Link VL enabling table in accordance with the invention, indicated with Table TAB, is set forth herein below. Such a table comprises a plurality of rows and two columns. A first column of the table TAB includes sequentially enabling time values ti or relative time of the Virtual Links VL starting from an initial time value t0 equal to zero.

A second column of the table TAB includes a number (1, 2, 3, indicative of the Virtual Link VL enabled at each of such times.

It shall be noted that the activation times of each Virtual Link VL are preset based on the bandwidth allocated to the Virtual Link VL itself, and on the duration of the single transmission of the packets on the Virtual Link.

TABLE TAB

| | RELATIVE TIME | NUMBER OF VLs TO BE TRANSMITTED |
|---|---|---|
| t0 | 0.00 mSec | 1 |
| t1 | 0.10 mSec | 2 |
| t2 | 0.20 mSec | 3 |
| t3 | 1.00 mSec | 1 |
| t4 | 2.00 mSec | 1 |
| t5 | 2.10 mSec | 2 |
| t6 | 3.00 mSec | 1 |
| t7 | 4.00 mSec | 1 |
| t8 | 4.10 mSec | 2 |
| t9 | 4.20 mSec | 4 |
| ... | ... | |

As it is known, the dimension of a single data packet multiplied by number of packets transmitted per second defines the bandwidth allocated to the Virtual Link.

In an embodiment, with the aim of optimizing the broadcast bandwidth, multiple Virtual Links VLs can be triggered simultaneously, provided that the paths on the network do not intersect each other.

It shall be noted that the content of the above-mentioned Table TAB is set during the start-up step of the first switch SW1 and it cannot be changed during the operative step or run-time of the same switch SW1.

An example of the method for transmitting data frames in the above-mentioned Ethernet Arinc 664p7 network 100 of the invention will be described herein below.

In order to generate the common piece of timing information, the method provides for carrying out a sequential scan of the table TAB, in particular of the first column of table TAB including the values of the enabling times ti (i=1, 2, 3 . . . ) of the Virtual Links VL, starting from an initial time value t0. Next, it is provided to track, in the second column of table TAB, the number indicative of the Virtual Link VL enabled for the transmission of the data frames corresponding to each of the enabling times.

In more detail, after 1 millisecond from the beginning of the scanning, the time scheduling function block 204 establishes that the Virtual Link VL=1 can transmit data. Therefore, the time scheduling function block 204 is configured to generate a function mode frame FMF to be sent to one of the end systems of the group ES1-ES6, which is configured for transmitting on the Virtual Link VL=1. Alternatively, such a function mode frame FMF can be sent indifferently to all the end systems ES1-ES6 of the network 100.

It shall be noted that the function mode block or frame FMF is, for example, a 64-byte frame in accordance with the Arinc 664 standard.

In case that one of the above-mentioned end systems, for example, the first End-System ES1, has a data frame to be transmitted relative to the Virtual Link VL=1, in particular, the respective LRU (Line Replaceable Unit) component has a data frame to be transmitted, such first end system ES1 sends, in reply to the function mode frame FMF, the above-mentioned data frame in accordance with the Arinc 664p7 communication protocol to the first switch SW1.

The first switch SW1 switches such frame by the switching function block 203 in order to route it to the suitable output port by sending it to one or more of the other end systems of the network 100.

In such a manner, the Arinc 664p7 network 100 is made completely deterministic.

Furthermore, still referring to FIG. 2, the start-up step of the first switch SW1 is managed by a suitable configuration function block 205 suitable to control each of the above-mentioned function blocks 202, 203, 204. In the case of the time scheduling function block 204, the configuration function block 205 is suitable to transfer information about the above-mentioned Virtual Link VL enabling table TAB to such a frame 204, the content of which table is stored in a memory of the first switch SW1, for example, a flash memory.

As set forth above, in an alternative embodiment of the present invention, the time scheduling function block 204 can be associated to any of the end systems of the group ES1-ES6 in place of the switch SW1.

The avionics Ethernet communication network 100 in accordance with the standard Arinc 664p7 of the present invention has a number of advantages.

Particularly, such a network 100 is a completely deterministic switched network, by virtue of the use of the time scheduling function block 204, which provides the common piece of timing information about the Virtual Links VL to all the end systems ES1-ES6 of the network.

Furthermore, the Applicant could verify that the network 100 of the present invention has high performance in terms of bandwidth allocation, configurability, and routing ability of the data frames.

To the embodiments of the above-described avionics communication Arinc 664p7 network, and to the related data transmission method, one of ordinary skill in the art, in order to meet contingent needs, will be able to make modifications, adaptations, and replacements of elements with other functionally equivalent ones, without for this departing from the scope of the following claims. Each of the characteristics described as belonging to a possible embodiment can be implemented independently from the other embodiments described.

The invention claimed is:

1. An avionics switched full-duplex Ethernet communication network, comprising at least two independent elementary networks, each of said elementary networks comprising:

at least one first end system configured to act as a source end system for data frames transmitted over the network;

at least one second end system configured to act as a destination end system for said transmitted data frames;

a data switching device connected between said at least one first end system and at least one second end system;

wherein said data switching device comprises a timer configured to generate a common piece of timing information to be sent both to the at least one first end system and to the at least one second end system of the elementary network to enable transmission of said data frames over said elementary network by said at least one first end system; and wherein said timer is configured to generate said common piece of timing information on the basis of first information extracted sequentially from a table associated with said data switching device, each piece of said first information being indicative of an enabling state of a virtual link associated with the elementary network through which the data frames can be transmitted.

2. The Ethernet communication network according to claim 1, wherein said table is a Virtual Link enablement table comprising a plurality of rows and two columns, a first column including sequentially values of enabling times of the Virtual Links starting from an initial time value, and a second column including a number indicative of the Virtual Link that is enabled at each of said times.

3. The Ethernet communication network according to claim 1, wherein the-timer of said data switching device is implemented in a time scheduling function block operatively connected to a data switching function block to provide the common piece of timing information to said switching function block.

4. The avionics Ethernet communication network according to claim 3, wherein said data switching device further comprises:
an input/output unit for the data frames exchanged over the network;
a filtering function block operatively connected to said input/output unit to perform a filtering on the data frames incoming to the data switching device by selecting said data frames on the basis of first assessment parameters;
the switching function block operatively connected to both said input/output unit and said filtering function block to manage routing of the data frames received from the filtering function block towards said input/output unit on the basis of a characterization of the enabled Virtual Link based on said piece of timing information.

5. The avionics Ethernet communication network according to claim 4, wherein said data switching device further comprises a configuration function block adapted to transfer to the time scheduling function block the first information of the Virtual Link enabling table, extracted from a memory of the data switching device.

6. The avionics Ethernet communication network according to claim 1, wherein each of said first elementary networks and second elementary networks comprises at least six end systems, each of said end systems being adapted to act indifferently as a source or destination terminal for the data frames exchanged over the network.

7. The avionics Ethernet communication network according to claim 6, wherein said end systems are selected from the group consisting of: sensor, electronic switch, avionics navigation tool.

8. The avionics Ethernet communication network according to claim 4, wherein said data switching device is produced from a digital integrated circuit of the Field Programmable Gate Array or FPGA type .

9. A method for transmitting data frames in an avionics switched full-duplex Ethernet communication network, wherein said network comprises at least two independent elementary networks, each of said elementary networks comprising:
at least a first end system and at least a second end system acting as source/destination end systems for data frames transmitted over the network;
a data switching device connected between said at least a first end system and the at least a second end system;
the method comprising the steps of:
generating, by said data switching device, a common piece of timing information indicative of an enabling state of a Virtual Link associated to the elementary network, wherein said step of generating a common piece of timing information comprises:
extracting first information indicative of an enabling state of a Virtual Link from a table comprising a plurality of rows and two columns, said extracting comprising:
scanning sequentially a first column of the table including enabling time values of the Virtual Link starting from an initial time value;
tracking in a second column of the table a number indicative of the Virtual Links enabled for transmission of data frames at each of said enabling time values;
sending said piece of timing information both to the at least a first end system and to the at least a second end system;
generating, by the data switching device, a function mode frame to be sent to both said at least a first end system and said at least a second end system, wherein at least one of said end systems is configured to transmit data frames on the enabled Virtual Link;
sending data frames by one said at least a first end system and at least a second end system towards the data switching device;
switching said data frame received by the data switching device to the other one of the at least a first end system and at least a second end system.

* * * * *